United States Patent [19]
Grot

[11] 3,849,243

[45] Nov. 19, 1974

[54] LAMINATES OF SUPPORT MATERIAL AND FLUORINATED POLYMER CONTAINING PENDANT SIDE CHAINS CONTAINING SULFONYL GROUPS

[75] Inventor: Walther Gustav Grot, Chadds Ford, Pa.

[73] Assignee: E. I. du Pont de Nemours and Company, Wilmington, Del.

[22] Filed: Aug. 1, 1973

[21] Appl. No.: 384,497

Related U.S. Application Data

[63] Continuation-in-part of Ser. No. 196,772, Nov. 8, 1971, Pat. No. 3,770,567.

[52] U.S. Cl. ... 161/189, 117/126 GB, 117/138.8 UF, 161/204, 161/254, 161/256, 260/79.3 M, 260/2.1, 156/306

[51] Int. Cl. .................. B32b 27/06, B32b 27/04

[58] Field of Search .......... 161/189, 204, 256, 254; 260/79.3 M; 117/126 GB, 138.8 UF

[56] References Cited
UNITED STATES PATENTS

| | | | |
|---|---|---|---|
| 2,393,967 | 2/1946 | Brubaker | 260/92.1 |
| 2,773,781 | 12/1956 | Rodman | 161/189 X |
| 3,041,317 | 6/1962 | Gibbs et al. | 260/79.3 M |
| 3,676,290 | 7/1972 | Hetrick | 161/189 |
| 3,692,569 | 9/1972 | Grot | 161/189 X |
| 3,770,567 | 11/1973 | Grot | 161/189 |

*Primary Examiner*—George F. Lesmes
*Assistant Examiner*—Alan T. McDonald

[57] ABSTRACT

A laminate comprising a first layer of fluorinated polymer containing pendant side chains containing sulfonyl groups wherein a majority of the sulfonyl groups are in the $-(SO_2NH)_mQ$ form wherein Q is H, cation of an alkali metal, cation of an alkaline earth metal or combination thereof and m is the valence of Q, and a second layer of fluorinated polymer containing pendant side chains containing sulfonyl groups wherein the sulfonyl groups are in the $-SO_2M$ form wherein M is a halogen atom, said second layer being integral with said first layer and containing support material completely encapsulated therein; and a process for preparing such; said laminate being useful as an intermediate for an ion exchange membrane.

5 Claims, No Drawings

LAMINATES OF SUPPORT MATERIAL AND FLUORINATED POLYMER CONTAINING PENDANT SIDE CHAINS CONTAINING SULFONYL GROUPS

CROSS-REFERENCE TO RELATED APPLICATION

The present application is a continuation-in-part of copending application Ser. No. 196,772, filed Nov. 8, 1971, now U.S. Pat. No. 3,770,567.

This invention relates to laminates of support material and fluorinated polymers containing pendant side chains containing sulfonyl groups, a majority of the sulfonyl group of one surface being in the $—(SO_2NH)_mQ$ form wherein Q is H, cation of an alkali metal, cation of an alkaline earth metal or combination thereof, and m is the valence of Q while the sulfonyl groups of the other surface are in the $—SO_2M$ form wherein M is a halogen atom; the support material being completely encapsulated within the portion of the fluorinated polymer with the sulfonyl groups in the $—SO_2M$ form. This invention also relates to a process for preparing the laminate which involves differential pressure lamination.

Fluorinated polymers containing pendant side chains containing sulfonyl groups are known. Their use as ion exchange membranes is also known. It is desirable to have an ion exchange membrane which is supported, i.e., contains a material which imparts physical strength to the fluorinated polymer which is greater than that of a mere film of the fluorinated polymer. Heretofore, methods for supporting such membranes have not been sufficient for if complete encapsulation of the support material were to be assured, excessively thick films of fluorinated polymer were required. Such excessive film thickness increases the cost of the membrane and reduces the usefulness of the membrane for ion exchange purposes. If the support is not completely encapsulated, the membrane will leak and its usefulness is reduced.

A process has been developed which allows for complete encapsulation of support material into fluorinated polymer containing pendant side chains containing sulfonyl groups without the problems as set forth above. The process results in a laminate and comprises (1) contacting the $—SO_2M$ surface of a film of a fluorinated polymer containing pendant side chains containing sulfonyl groups wherein the sulfonyl groups of one surface of said film are in the $—SO_2M$ form wherein M is a halogen atom and a majority of the sulfonyl groups of the other surface of the film are in $—(SO_2NH)_mQ$ form wherein Q is H, cation of an alkali metal, cation of an alkaline earth metal and combination thereof, and m is the valence of Q, and (2) applying a differential pressure to the contacted support material and film with the sulfonyl groups in contact with the support material in the $—SO_2M$ form, the pressure on the opposite surface of the support material from that which is contacting said fluorinated polymer film being at least 5 inches of mercury less than the pressure on the surface of the fluorinated polymer film opposite to that contacting the support material, for a sufficient period of time to cause the support material which is in contact with said film to become completely encapsulated within the film of fluorinated polymer while heating the film and support material at from 240°–320°C.

The laminate which results from the process comprises a first layer of fluorinated polymer containing pendant side chains containing sulfonyl groups wherein the sulfonyl groups are in the $—(SO_2NH)_mQ$ form with Q and m as previously defined, and a second layer of fluorinated polymer containing pendant side chains containing sulfonyl groups wherein the sulfonyl groups are in the $—SO_2M$ form wherein M is a halogen atom, said second layer being integral with said first layer and containing support material completely encapsulated therein. Preferred halogen atoms are F or Cl, the former being most preferred. This laminate is relatively dimensionally stable and is resistant to tearing.

The use of complete encapsulation throughout means that the support material which is in contact with the fluorinated polymer is completely encapsulated. Thus, both in the process for preparing the laminate and the laminate itself, the support material can be larger in area than the film of fluorinated polymer and the excess area of encapsulated support material can extend from the sides of the laminate. This excess is normally trimmed off before the laminate is utilized as an ion exchange membrane. The encapsulation of the support material is sufficient to form a continuous film of fluorinated polymer on the opposite surface of the support material from that originally contacting the fluorinated polymer film. There can be sufficient fluorinated polymer to fill the entire thickness of the fabric and produce a uniformly thick laminate. Preferably, however, there is not enough fluorinated polymer to fill the entire thickness of the fabric. Thus, the film of fluorinated polymer, while completely encapsulating the support material with which it is in contact, follows the configuration of the support material on the surface of the support material which originally contact the fluorinated polymer film.

The film of this invention is a fluorinated polymer containing pendant side chains containing sulfonyl groups. The polymers are prepared from monomers which are fluorinated or fluorine substituted vinyl compounds. The polymers are made from at least two monomers with at least one of the monomers coming from each of the two groups described below. The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof.

The second group is the sulfonyl-containing monomers containing the usual precursor $—SO_2F$. Additional examples can be represented by the generic formula $CF_2=CFR_fSO_2F$ wherein $R_f$ is a bifunctional perfluorinated radical comprising 1 to 8 carbon atoms. The particular chemical content or structure of the radical linking the sulfonyl group to the copolymer chain is not critical but such must have a fluorine atom attached to the carbon atom to which is attached the sulfonyl group if the sulfonyl group is in the $—(SO_2NH)_mQ$ form wherein Q is H, cation of an alkali metal, cation of an alkaline earth metal or combination thereof, and m is the valence of Q. It is understood in the definition of Q that "combination thereof" includes a combination of cations of alkali metals and/or cations of alkaline earth metals. If the sulfonyl group is attached directly to the chain, the carbon in the chain to which it is attached must have a fluorine atom attached to it if the sulfonyl group is in the $—(SO_2NH)_mQ$ form.

The $R_f$ radical of the formula above can be either branched or unbranched, i.e., straight chain and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are $CF_2=CFOCF_2CF_2SO_2F$,

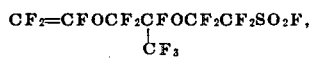

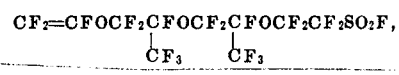

$CF_2=CFCF_2CF_2SO_2F$, and

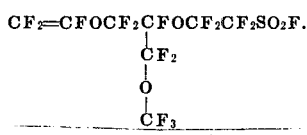

The most preferred sulfonyl fluoride containing comonomer is perfluoro(3,6-dioxa-4-methyl-7-octenesulfonyl fluoride),

The sulfonyl-containing monomers are disclosed in such references as U.S. Pat. No. 3,282,875 to Connolly et al., U.S. Pat. Nos. 3,041,317 to Gibbs et al., and 3,560,568 to Resnick and 3,718,627 to Grot.

The preferred copolymers utilized in the film are perfluorocarbon although others can be utilized. The most preferred copolymer is a copolymer of tetrafluoroethylene and perfluoro(3,6-dioxa-4-methyl-7-octenesulfonyl fluoride) which comprises 20 to 60 percent, preferably, 30 to 50 percent by weight of the latter.

The copolymer used in the present invention is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962; that is, by the polymerization of a mixture of the major monomer therein, such as tetrafluoroethylene and a fluorinated ethylene containing sulfonyl fluoride in the presence of a free radical initiator, preferably a perfluorocarbon peroxide or azo compound, at a temperature in the range of 0°–200°C. and at pressures in the range 1–200, or more, atmospheres. The nonaqueous polymerization may, if desired, be carried out in the presence of a fluorinated solvent. Suitable fluorinated solvents are 1,1,2-trichloro-1,2,2-trifluoroethane and inert liquid, perfluorinated hydrocarbons, such as perfluoromethylcyclohexane, perfluorodimethylcyclobutane, perfluorooctane, and the like.

Aqueous techniques for preparing the copolymer of this invention include contacting the monomers with an aqueous medium containing a free-radical initiator to obtain a slurry of polymer particles in nonwater-wet or granular form, as disclosed in U.S. Pat. No. 2,393,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example in U.S. Pat. No. 2,559,752, issued to K. L. Berry on July 10, 1951, and U.S. Pat. No. 2,593,583, issued to J. F. Lontz on Apr. 22, 1952.

Preparation of the film into which the support material is encapsulated normally begins with a film of fluorinated polymer which contains sulfonyl groups in the form of $-SO_2M$ with $-SO_2F$ preferred. If this polymer in film form is employed for encapsulation of the support material, a pronounced tendency exists for the film to develop holes or to rupture.

Therefore, this polymer does not have sufficient physical strength to maintain the integrity of the film during the encapsulation of the support material and a majority of the sulfonyl groups of one portion of the film are converted to the $-(SO_2NH)_mQ$ form. This portion of the film will maintain its integrity at the operating temperature of the encapsulation of the support material into the section of the film wherein the sulfonyl groups are in the $-SO_2M$ form. In the above definition of Q, preferred embodiments include the cation of an alkali metal and cation of an alkaline earth metal.

With the film employed in the encapsulation process with the support material, the starting polymer will ordinarily contain the sulfonyl groups in the $-SO_2M$ form. Thereafter, a majority of the sulfonyl groups on one surface are converted from the $-SO_2M$ form to the $-(SO_2NH)_mQ$ form wherein Q is H and $m$ is 1 by contacting the laminate with anhydrous ammonia which can be in gaseous form, in liquid form, as a mixture with air or other gas which will not react with the sulfonyl group or the rest of the polymer or ammonia in a solvent which is nonaqueous and nonreactive with the polymer such as dimethyl sulfoxide. This $-(SO_2NH)_mQ$ form wherein Q is H can be further converted to $-(SO_2NH)_mQ$ form wherein Q is cation of an alkali metal or cation of an alkaline earth metal. This is accomplished by contacting the $-(SO_2NH)_mQ$ (wherein Q is H) sulfonyl groups with the hydroxides of the cation of the alkali metal or cation of the alkaline earth metal.

The thickness of the $-(SO_2NH)_mQ$ layer of the film may vary but generally will be at least 200 angstroms, to give sufficient strength to the fluorinated film to maintain the film integrity during a laminating and encapsulating process. Additionally, this minimum thickness of the polymer with the sulfonyl groups in the $-(SO_2NH)_mQ$ form will be desirable in the final film used in ion exchange. The remainder of the film contains the sulfonyl groups in the $-SO_2M$ form which is the form that is conducive to differential pressure encapsulation of the supporting material. There should be enough of this latter layer present before the supporting material is encapsulated therein to allow for the subsequent complete encapsulation. Normally, a thickness of at least 50 microns is desirable.

The process for preparing the laminate comprises (1) contacting the $-SO_2M$ surface of a film of fluorinated polymer containing pendant side chains containing sulfonyl groups with a support material, said film being integral and having (a) the sulfonyl groups of one surface of said film in the $-SO_2M$ form wherein M is a halogen atom, (b) the sulfonyl groups of the other surface of the film attached to carbon atoms which have at least one fluorine atom attached thereto, a majority of said sulfonyl groups being in the $-(SO_2NH)_mQ$ form wherein Q and $m$ have been previously defined, and (2) applying a differential pressure to the contacted support material and film, the pressure on the opposite surface of the support material from that which is contacting said fluorinated polymer film being at least 5 inches of mercury less than the pressure on the surface of the fluorinated polymer film to that contacting the support material. The pressure differential is preferably at least 20 inches of mercury. The temperature at which the polymer and support member is maintained during the drawing of the film into the support material is from 240°–320°C. with a preferred range of 260° to 290°C. The process is continued until enough of the $-SO_2M$ form of the fluorinated polymer has been drawn through and around the support material so that the support is completely encapsulated. The time required varies with the film, temperature and pressure used. Normally, 2 to 15 minutes are required.

Normally, release paper will be utilized between the surface of the support material opposite to that contacting the fluorinated polymer film and the equipment on which the encapsulation process is accomplished. The release paper should have the following characteristics: (1) It should permit the passage of air so that the application of the differential pressure is effective; a very small degree of porosity is sufficient for this purpose, and (2) The pores of the paper must be small enough so that the molten polymer cannot penetrate into such pores. Paper having a clay or kaolin coating, frequently used for offset printing, meets the above requirements. It is normally desirable to apply a small quantity of a release agent to the surface of the paper which is to contact the fluorinated polymer after encapsulation. Halftone printing on the paper can be utilized in lieu of a release agent.

The support material which is utilized in the laminate must be able to withstand the temperatures involved in the encapsulation. It must also be able to withstand treatment with caustic solutions such as sodium hydroxide, or withstand treatment with ammonium hydroxide. Useful support materials which can withstand treatment with ammonium hydroxide are quartz fabric, glass mat, glass fabric, and fluorocarbon resin fabric. The fluorocarbon resin fabric can also withstand treatment with such things as sodium hydroxide. The preferred fluorocarbon resin fabric is perfluorocarbon. Examples of preferred fabrics are polytetrafluoroethylene fabric, and tetrafluoroethylene/hexafluoropropylene copolymer fabric. Examples of other preferred fluorinated resin fabrics are chlorotrifluoroethylene polymer fabric, and tetrafluoroethylene/ethylene polymer fabric. The fabric is normally from 8 to 15 mils thick. If quartz fabric, glass mat, or glass fabric are utilized as the support material, the laminate shall not be post treated with hydroxides other than NH$_4$OH.

The laminate in the form in which it is produced from the process is an intermediate for an ion exchange membrane.

Prior to use the fluorinated polymer containing pendant side chains with sulfonyl groups in the $-SO_2M$ form are converted either to the $-(SO_2NH)_mQ$ form as previously defined or to the $-(SO_3)_nMe$ form wherein Me is a metallic ion or NH$_4$ and $n$ is the valence of Me. Me is preferably a member of the class consisting of cation of an alkali metal and cation of an alkaline earth metal. Preferred cations are of the alkali metals such as Na or K with the former being most preferred.

Conversion may be undertaken as in accordance with U.S. Pat. No. 3,282,875. Illustratively, the sulfonyl groups in the $-SO_2F$ form may be contacted with Ma-(OH)$_P$ wherein P is the valence of Ma and Ma is NH$_4$, cation of an alkali metal or cation of an alkaline earth metal.

Illustrative examples of useful ion exchange membranes are those wherein the laminate has the sulfonyl groups of one surface in the $-(SO_3)_nMe$ form, particularly where Me is sodium, and the sulfonyl groups of the other surface in the $-(SO_2NH)_mQ$ form, particularly where Q is Na or H and $m$ is one. These ion exchange membranes are useful for normal ion exchange purposes. Membranes which contain fluorocarbon resin fabric support are particularly useful in a chloroalkali cell.

The following Example is meant to illustrate but not to limit the invention. All parts and percentages are by weight unless otherwise specified.

EXAMPLE

Two separate 7-mil films of a copolymer of tetrafluoroethylene and

(mole ratio of the former to the latter was 7.5:1) having the sulfonyl groups of the polymer in the $-SO_2F$ form were blocked together to permit treatment of one surface only. The blocked sheet was immersed for 3 hours in boiling anhydrous ammonia (temperature $-33°F$.) containing approximately 3 percent potassium amide. After staining with Seoron Red, microscopic examination indicated a thickness of reaction of approximately 0.6 mil to yield $-SO_2NHK$. One of the films was utilized in the lamination process described below.

The laminating equipment utilized in the lamination process consisted of an aluminum plate one half inch thick with a series of grooves machined into the top surface to distribute the differential pressure across the top of the plate. The differential pressure was applied through a hole drilled in the side of the plate, the hole being connected with the grooves on the top of the plate. A 60 mesh wire screen was placed on the plate to further distribute the differential pressure to every point on the top surface. On top of the wire screen was placed a sheet of asbestos paper which acted as the support for the release paper which formed the surface on which the actual lamination was performed. The paper utilized was Mead BS 80, offset enamel paper (Mead Papers, Inc., Dayton 2, Ohio). The support material which was a piece of "Teflon" fluorocarbon resin fabric (polytetrafluoroethylene) (pattern T20–44G made by Stern & Stern Textiles, Inc., 1359 Broadway, New York, N.Y.) was placed on the release sheet. On top of the fabric had been placed the film described above with the $-SO_2F$ surface against the fabric. The fluorinated polymer film was slightly larger than the other components so that by taping the edge of the fluorinated polymer sheet against the aluminum plate, an airtight package was obtained.

A hydraulic press was used as a heat source in the limination process. However, the press did not apply pressure to the sample at any time. The press contained an electrically heated hot plate (24 × 30 inches). This hot plate was actually the lower platen of the hydraulic press and could be raised and lowered. Suspended above this was a 1 inch thick aluminum plate which was covered with 1 inch of glass wool insulation. This aluminum plate was heated prior to the experiment by raising the heated lower platen to make contact with the aluminum plate. After the aluminum plate reached the desired temperature, the bottom platen was lowered.

A differential pressure of 20 inches of mercury was applied to the laminating equipment described above, followed by insertion of the equipment into the press. The bottom platen was raised so that there was a one-half inch clearance between the laminating equipment and the top plate of the press. The press had been preheated to 280°C. at the top and an average of 285°C. at the bottom. During the lamination, the top and bottom temperature both dropped 3°C. The laminating equipment was left in position for about 6 minutes. The differential pressure was released after the plate had cooled to room temperature.

Examination of the laminate showed that the fabric was completely encapsulated, i.e., the fluorinated polymer in the $-SO_2F$ form had fused together under the fabric to form a continuous unbroken surface, while at the same time the fluorinated polymer in the $-SO_2NHK$ form had formed an unbroken upper surface.

What is claimed is:

1. A laminate comprising a first layer of fluorinated polymer containing pendant side chains containing sulfonyl groups which are attached to carbon atoms which have at least one fluorine atom attached thereto wherein a majority of the sulfonyl groups are in the $-(SO_2NH)_mQ$ form, Q being selected from the group consisting of H, cation of an alkali metal, cation of an alkaline earth metal and combinations thereof, and $m$ being the valence of Q; and a second layer of fluorinated polymer containing pendant side chains containing sulfonyl groups wherein the sulfonyl groups are in the $-SO_2M$ form wherein M is a halogen atom, said second layer being integral with said first layer and containing support material completely encapsulated therein.

2. The laminate of claim 1 wherein the support material is selected from the class consisting of fluorinated resin fabric, quartz fabric, glass mat and glass fabric.

3. The laminate of claim 1 wherein Q is cation of an alkali metal, cation of an alkaline earth metal and combination thereof.

4. The laminate of claim 2 wherein M is F.

5. The laminate of claim 4 wherein Q is Na and $m$ is 1.

* * * * *